(12) United States Patent
Tsuchiya

(10) Patent No.: US 6,753,179 B2
(45) Date of Patent: Jun. 22, 2004

(54) METHOD FOR PURIFICATION TREATMENT OF ENVIRONMENTAL POLLUTANTS

(75) Inventor: Akihito Tsuchiya, Shiga-ken (JP)

(73) Assignee: Allmighty Co., Ltd., Himeji (JP)

( * ) Notice: Subject to any disclaimer, the term of this patent is extended or adjusted under 35 U.S.C. 154(b) by 68 days.

(21) Appl. No.: 09/731,863

(22) Filed: Dec. 8, 2000

(65) Prior Publication Data

US 2001/0027947 A1 Oct. 11, 2001

(30) Foreign Application Priority Data

Dec. 8, 1999 (JP) ............................................ 11-349426

(51) Int. Cl.$^7$ ................................................. C12S 13/00
(52) U.S. Cl. .................... 435/262.5; 435/262; 435/177; 435/178; 435/182
(58) Field of Search ................................ 435/177, 178, 435/182, 262, 262.5; 210/610, 611, 617, 618, 150

(56) References Cited

U.S. PATENT DOCUMENTS 4,954,443 A * 9/1990 Yamada et al. ............. 435/177
4,971,698 A * 11/1990 Weber et al. ............... 210/615
5,700,848 A * 12/1997 Soon-Shiong et al. ...... 424/451

* cited by examiner

Primary Examiner—William H. Beisner
(74) Attorney, Agent, or Firm—Armstrong, Kratz, Quintos, Hanson & Brooks, LLP

(57) ABSTRACT

The present invention provides a method of biological treatment for purifying an environmental pollutant utilizing microorganisms, wherein the pollutant is efficiently concentrated to a high concentration but exerts substantially no effect on the biological activity of the microorganisms used to biodegrade the pollutant, so that the pollutant are purified (assimilated or degraded) effectively. The present invention also provides a microbial treatment agent useful for the purification treatment of an environmental pollutant. Specifically stated, the method for purification treatment of the present invention can be carried out by making an environmental pollutant and microorganisms to coexist with each other as incorporated in a microorganism-produced polymer. The microbial treatment agent of the present invention comprises microorganisms incorporated in a microorganism-produced polymer.

29 Claims, No Drawings

METHOD FOR PURIFICATION TREATMENT OF ENVIRONMENTAL POLLUTANTS

TECHNICAL FIELD

The present invention relates to methods for purifying an environmental pollutant using microorganisms. More specifically, the present invention relates to purification methods wherein an environmental pollutant is concentrated in the presence of microorganisms while being prevented from reducing the biological activity of the microorganisms, to perform biodegradation and purification (assimilation or degradation) of the pollutant more efficiently.

BACKGROUND ART

Conventionally, environmental pollutants discharged as wastes are disposed of by incineration, landfill, ocean dumping, chemical treatment, physical treatment, biological treatment, etc. Of these disposal methods, biological treatment is broadly divided according to the environmental pollutant to be disposed of, into two types of treatment, i.e., treatment of liquid wastes such as sewage and industrial waste water, and treatment of solid wastes such as chemical products (e.g., plastics) and garbage. Since the biological treatment has the advantage of less secondary pollution than other disposal methods, much is expected of the biological treatment as a method for purifying environmental pollutants.

The biological treatment, however, has the problem that it depends on the biological ability of microorganisms, and thus its efficiency of purifying environmental pollutants greatly varies according to the microorganisms used. For example, when waste water containing only a trace amount of a target environmental pollutant is purified using microorganisms, components other than the target pollutant, which are present in great amounts, cause growth or proliferation of other species of microorganisms which assimilate or degrade such components. As a result, the microorganisms capable of biodegrading the target pollutant are inhibited from proliferating, failing to sufficiently purify the pollutant. Further, an environmental pollutant, when present at a certain concentration or higher, inhibits growth of microorganisms. It is therefore difficult to biologically treat a high concentration of environmental pollutant using microorganisms.

Recently, therefore, methods have been employed which utilize a pure culture of microorganisms with high assimilating or degrading ability to environmental pollutants, to increase the efficiency of biological purification treatment. Further, studies have been recently made on use of microorganisms with high assimilating or degrading ability as immobilized on an inorganic or organic support.

The most important problem remaining with the biological treatment is how to cause microorganisms with high assimilating or degrading ability to capture environmental pollutants efficiently and to assimilate or degrade the pollutants effectively. To solve this problem, a method has been studied in which a porous support (e.g., activated carbon or zeolite) having microorganisms adsorbed and immobilized thereon, is contacted with and allowed to adsorb an environmental pollutant diluted to a concentration that does not inhibit growth of the microorganisms, whereby the microorganisms act on the environmental pollutant in the pores of the support. However, the pollutant adsorbed by this method will have a high concentration in the pores of the support and inhibit growth of the microorganisms. Thus, this method fails to achieve an expected level of assimilation or degradation of the pollutant.

DISCLOSURE OF THE INVENTION

An object of the present invention is to provide a method for purifying an environmental pollutant by biological treatment with microorganisms, wherein the pollutant is efficiently concentrated to a high concentration, but exerts substantially no effect on the biological activity of the microorganisms used for biodegradation of the pollutant, so that the pollutant is purified (assimilated or degraded) effectively. Another object of the present invention is to provide a microbial treatment agent useful for effectively performing the method for purification (assimilation or degradation) of an environmental pollutant.

The present inventors conducted extensive research to achieve the above objects, and found that when the microorganisms for use in biological treatment are incorporated into a microorganism-produced polymer, the microorganisms are not severely inhibited from growing even in the presence of a high concentration of a pollutant, and retain their biological activity necessary for assimilation or degradation of the pollutant. They further found that when the microorganism-produced polymer coexists with an environmental pollutant, the pollutant is incorporated into the polymer and concentrated efficiently. The present inventors conducted further research based on the above findings, and confirmed that when an environmental pollutant as incorporated in a microorganism-produced polymer coexists with microorganisms capable of assimilating or degrading the pollutant, a high concentration of the pollutant can be efficiently purified (assimilated or degraded) without inhibiting the biological activity of the microorganisms. The present invention has been accomplished based on these findings.

The present invention provides methods for purification treatment of an environmental pollutant using microorganisms, as described in the following items (1) to (9).

(1) A method for purification treatment of an environmental pollutant, wherein the environmental pollutant and microorganisms are made to coexist with each other as incorporated in a microorganism-produced polymer.

(2) The method according to the item (1), wherein the microorganism-produced polymer is a polymer containing a sugar component in which fructofuranosyl group(s) is/are bonded to a fructosyl group at the β-2,6 position.

(3) The method according to the item (1), wherein the microorganism-produced polymer is a polyamino acid containing at least one amino acid selected from the group consisting of glutamic acid, leucine, alanine and phenylalanine.

(4) The method according to the item (1), wherein the microorganism-produced polymer is a polyamino acid substantially consisting of glutamic acid, leucine, alanine or phenylamine.

(5) The method according to the item (1), wherein the microorganism-produced polymer is a polyamino acid containing at least 65% of one amino acid selected from the group consisting of glutamic acid, leucine, alanine and phenylalanine.

(6) The method according to the item (1), wherein the microorganism-produced polymer is used in the presence of a cationic inorganic salt.

(7) The method according to the item (6), wherein the cationic inorganic salt is at least one member selected from the group consisting of aluminum chloride, aluminum sulfate, sodium aluminate, calcium chloride, ferrous sulfate, ferric chloride, iron(III) sulfate and copper chloride.

(8) The method according to the item (1), wherein the microorganisms are at least one member selected from the group consisting of the genera Pseudomonas, Rhodococcus, Aeromonas, Rhizobium, Sphingomonas, Arthrobacter, Frateuria, Flavobacterium and Bacillus.

(9) The method according to the item (1), wherein the environmental pollutant is at least one member selected from the group consisting of polychlorinated biphenyls, dioxins, dichloroethylenes, dichloroethanes, trichloroethylenes, trichloroethanes, mercury and its compounds, and selenium and its compounds.

The present invention also provides microbial treatment agents useful for the above methods for purifying an environmental pollutant:

(10) A microbial treatment agent comprising microorganisms incorporated in a microorganism-produced polymer.

(11) The microbial treatment agent according to the item (10), wherein the microorganisms are at least one member selected from the group consisting of the genera Pseudomonas, Rhodococcus, Aeromonas, Rhizobium, Sphingomonas, Arthrobacter, Frateuria, Flavobacterium and Bacillus.

(12) The microbial treatment agent according to the item (10), wherein the microorganisms are a mixture of at least two members selected from the group consisting of the genera Pseudomonas, Rhodococcus, Aeromonas, Rhizobium, Sphingomonas, Arthrobacter, Frateuria, Flavobacterium and Bacillus.

(13) The microbial treatment agent according to the item (10), wherein the microorganism-produced polymer is a polymer containing a sugar component in which fructofuranosyl group(s) is/are bonded to a fructosyl group at the β-2,6 position, or a polyamino acid containing at least one amino acid selected from the group consisting of glutamic acid, leucine, alanine and phenylalanine.

(14) The microbial treatment agent according to the item (10), wherein the microorganism-produced polymer is a polyamino acid substantially consisting of glutamic acid, leucine, alanine or phenylalanine.

(15) The method according to the item (10), wherein the microorganism-produced polymer is a polyamino acid containing at least 65% of one amino acid selected from the group consisting of glutamic acid, leucine, alanine and phenylalanine.

(16) The microbial treatment agent according to the item (10), wherein the microorganism-produced polymer is used in the presence of a cationic inorganic salt.

(17) The microbial treatment agent according to the item (16), wherein the cationic inorganic salt is at least one member selected from the group consisting of aluminum chloride, aluminum sulfate, sodium aluminate, calcium chloride, ferrous sulfate, ferric chloride, iron (III) sulfate and copper chloride.

(18) The microbial treatment agent according to the item (10), for use in assimilation or degradation of an environmental pollutant.

(19) The microbial treatment agent according to the item (10), wherein the environmental pollutant is at least one member selected from the group consisting of polychlorinated biphenyls, dioxins, dichloroethylenes, dichloroethanes, trichloroethylenes, trichloroethanes, ethylenes, mercury and its compounds, and selenium and its compounds.

BEST MODE FOR CARRYING OUT THE INVENTION

The present invention provides a method for purification treatment of an environmental pollutant, wherein the pollutant and microorganisms are together incorporated in a microorganism-produced polymer to thereby cause the microorganisms to effectively assimilate or degrade the pollutant.

The word "incorporated" is used herein to indicates either of the state of an environmental pollutant and microorganisms being surrounded by (wrapped in) a microorganism-produced polymer, or the state of an environmental pollutant being covered with microorganisms and a microorganism-produced polymer. Such states can be formed by any means without limitation. For example, a microorganism-produced polymer secreted in the growing process of microorganisms is contacted with a pollutant in a natural or artificial environment for growth of the microorganisms, to surround (wrap) the pollutant and microorganisms with the microorganism-produced polymer which increases as the microorganisms further grow. Alternatively, a microorganism-produced polymer and microorganisms may be artificially contacted and mixed with an environmental pollutant, to cover the pollutant with the microorganisms and microorganism-produced polymer.

Pollutants to be treated according to the present invention include a wide variety of substances that pollute environments (including the ecology and living environments of all the organisms including humans, non-human animals and plants, and natural environments), and are not limited in physicochemical or physical properties such as water solubility or insolubility. Specific examples of pollutants include polychlorinated biphenyls, dioxins, dichloroethylenes (such as 1,1-dichloroethylene, trans-1,2-dichloroethylene and cis-1,2-dichloroethylene), dichloroethanes (such as 1,2-dichloroethane), trichloroethanes (such as 1,1,1-trichloroethane and 1,1,2-trichloroethane), trichloroethylene, 1,2-dichloropropane, 1,3-dichloropropene, p-dichlorobenzene, dichloromethane, tetrachloroethylene and like chlorine-containing organic compounds; and mercury and its compounds, selenium and its compounds, and like inorganic compounds.

As used herein, the term "dioxins" is intended to mean a group of compounds including polychlorinated dibenzo-para-dioxins (PCDDs), polychlorinated dibenzofurans (PCDFs) and coplanar polychlorinated biphenyls (coplanar PCBs, coplanar-structure chlorinated biphenyls). More specifically, polychlorinated dibenzo-para-dioxins (PCDDs) include, for example, tetrachlorinated dibenzo-para-dioxins (TeCDDs), pentachlorinated dibenzo-para-dioxins (PeCDDs), hexachlorinated dibenzo-para-dioxins (HxCDDs), heptachlorinated dibenzo-para-dioxins (HpCDDs) and octachlorinated dibenzo-para-dioxins (OCDDs); and polychlorinated dibenzofurans (PCDFs) include, for example, tetrachlorinated dibenzofurans (TeCDFs), pentachlorinated dibenzofurans (PeCDFs), hexachlorinated dibenzofurans (HxCDFs), heptachlorinated dibenzofuran (HpCDFs) and octachlorinated dibenzofuran (OCDF). Coplanar PCBs are chlorinated biphenyls containing no, one or two chlorine atoms coordinated to the ortho position, and include 14 species consisting of non-ortho-chlorine substituted chlorinated biphenyls (non-ortho CBs, 4 species), mono-ortho-chlorine substituted chlorinated biphenyls (mono-ortho CBs, 8 species) and di-ortho-chlorine substituted chlorinated biphenyls (di-ortho CBs, 2 species). Other polychlorinated biphenyls include tetrachlorinated biphenyl (TeCB), pentachlorinated biphenyl (PeCB), hexachlorinated biphenyl (HxCB), heptachlorinated biphenyl (HpCB), 3,4,5,3,4,5-TCBs and the like.

Examples of other environmental pollutants include the following: zinc compounds, acrylonitrile, acetaldehyde, antimony and its compounds, isoxathion, iprobenfos, ethylene oxide, hydrogen chloride, chlorothalonil, vinyl chloride, chlorine, cadmium and its compounds, xylenes, chromium compounds, simazine, thiobencarb, chloroform, chloromethyl methyl ether, cyanides, isoprothiolane, diazinon, carbon tetrachloride, 2-sec-butylphenyl carbamate, molybdenum and its compounds, dichlorovos, fenitrothion, copper compounds, triphenyltin compounds, tributylbutyltin, toluene, lead compounds, nickel compounds, thiram, vanadium and its compounds, arsenic and its compounds, (O-ethyl-O-4-nitrophenyl) phenylthiophosphate, 1,3-butadiene, di-(2-ethylhexyl) phthalate, hydrofluoric acid, fluorine and its compounds, propyzamide, beryllium and its compounds, benzene, boron and its compounds, formaldehyde, manganese compounds, etc.

Microorganisms to be used in the present invention are not limited as long as they are capable of assimilating or degrading the above environmental pollutants, and include a wide variety of known microorganisms conventionally utilized in biological treatment of chemical substances, waste water and other wastes, and microorganisms that will be utilized in such treatment in the future. Specific examples of such microorganisms include various microorganisms present in activated sludge, composts, biologically treated wastes, various fungi [such as shiitake (*Lentinus edodes* Sing.), shimeji (*Lyophyllum Lyophllum shimeji* Hongo), enokitake (*Flammulina velutipes* Sing.), hiratake (Pleurotus (fries) Kummer), bunashimeji (*Lyophyllum ulmarium* (Bull.:Fr.) Kuhn.), mushrooms, nameko (*Kuehneromyces nameko* S. Ito), fuusentake (Cortinarius Persoon ex Gray), matsutake (*Tricholoma matsutake* Sing.), kawaradake (*Coriolus versicolor* Quel.), himetake (*Agarius blazei*), hourokutake (*Daedalea dickinsii* (Berk. ex Cke.) Yasuda) and other basidiomycetes], waste water-treating liquids and the like; and microorganisms commercially available as solid or liquid microorganism preparations, which may be in coarsely or finely purified form. The microorganisms for use in the present invention may be bacterial cells obtained by solid-liquid separation of a coculture or pure culture of an inoculum such as the above-mentioned activated sludge, fungi, biologically treated wastes, waste water-treating liquids or the like.

Preferred microorganisms are, for example, those of the genera Pseudomonas, Rhodococcus, Aeromonas, Rhizobium, Sphingomonas, Arthrobacter, Frateuria, Flavobacterium or Bacillus. The microorganisms for use in the invention may be of a single genus selected from the above genera, but it is preferable to use microorganisms of any two or more genera in a symbiotic state. When using two or more genera, the combination is not limited, and may be, for example, the genera Bacillus and Flavobacterium; the genera Rhodococcus and Aeromonas; the genera Pseudomonas and Rhizobium; the genera Sphingomonas and Bacillus; or the genera Flavobacterium and Arthrobacter.

The microorganism-produced polymer used for incorporating the pollutant and microorganisms and making them coexist, may be any of various polymers originally produced by microorganisms. However, the microorganism-produced polymer as such for use in the invention does not need to be a polymer produced directly from microorganisms. Preferred polymers include cohesive or adhesive polysaccharides produced from bacteria of the genera Zoogloer; levans produced from bacteria of the genera Bacillus, Acetobacter or Pseudomonas; polymers containing a sugar component in which fructofuranosyl group(s) is/are bonded to a fructosyl group at the β-2,6 position (including polysaccharides, glycoproteins, glycosides and the like); and polyamino acids, preferably a variety of polyamino acids produced from microorganisms of the genus Bacillus.

The molecular weight of the polymer is not limited, but is usually 10,000 or higher, preferably 20,000 or higher. More preferably, the polymer has a molecular weight of 100,000 to 3,000,000.

The amino acids forming the polyamino acid are not limited but may be glutamic acid, leucine, alanine or phenylalanine. The polyamino acid for use in the invention may be a homopolyamino acid substantially consisting of one of the above amino acids, or a heteropolyamino acid comprising at least two of the above amino acids with or without at least one other amino acid. It is desirable that one species of amino acid accounts for at least 65%, preferably at least 75%, more preferably at least 80%, of all the amino acids constituting the polyamino acid.

The microorganism-produced polymer is not limited in form, and may be a liquid, gel, foam or solid such as powder or granules, among which a powder is preferable.

The environmental pollutant and the microorganisms can be incorporated in the microorganism-produced polymer by a method wherein the pollutant is incorporated in the polymer and then mixed with the microorganisms; by a method wherein the microorganisms are incorporated in the polymer and then mixed with the pollutant; or by a method wherein the pollutant and microorganisms are separately incorporated in the polymer and then mixed together. It is desirable to incorporate the microorganisms and/or the pollutant into the polymer in the presence of water in an amount of usually at least 10 wt. %, preferably at least 50 wt. %, more preferably at least 70 wt. %. Stated specifically, the environmental pollutant can be incorporated into the microorganism-produced polymer by mixing the pollutant with the polymer in the presence of at least 10 wt. %, preferably at least 50 wt. %, more preferably at least 70 wt. % of water, to thereby form the mixture into a gel, pellets or a floc. Also, the microorganisms can be incorporated into the microorganism-produced polymer by mixing the microorganisms with the polymer in the presence of at least 10 wt. %, preferably at least 50 wt. %, more preferably at least 70 wt. % of water, to thereby form the mixture into a gel, pellets or a floc.

In this manner, the pollutant and the microorganisms can be incorporated into the polymer in the presence of water, so that the pollutant and the microorganisms can be made to coexist with each other as incorporated in the polymer.

The microorganism-produced polymer can be used singly, or may be used in combination with a cationic inorganic salt. It is preferable to use the polymer in the form of a microorganism-produced polymer composition containing the inorganic salt. Usable cationic inorganic salts are not limited and include aluminum chloride, aluminum sulfate, sodium aluminate and like aluminum salts; ferrous sulfide, ferric chloride, iron (III) sulfate and like iron salts; cuprous chloride and like copper salts; calcium chloride, calcium carbonate and like calcium salts; sodium chloride and like sodium salts; potassium chloride, dipotassium hydrogenphosphate and potassium dihydrogenphosphate and like potassium salts; and ammonium sulfate, magnesium sulfate, manganese sulfate and cobalt sulfate.

The microorganism-produced polymer and the cationic inorganic salt are not limited in form, and may be mixed together in a desired form, such as liquid or solid (e.g., powder). Each of the polymer and the cationic salt salt is preferably in powder form. The proportion of the cationic salt to the polymer is not limited, but it is preferable that the proportion of the salt is 0.1 to 1000 parts by weight, preferably 5 to 100 parts by weight, per 100 parts by weight of the polymer. Further, the microorganism-produced polymer may be formed into a microorganism-produced polymer composition containing galactomannans, starches, carboxymethyl celluloses, alginates (such as sodium alginate and potassium alginate), xanthan gum, pullulan or like thickening polysaccharides, chitin, chitosan or the like.

The amount of the thus obtained microorganism-produced polymer or microorganism-produced polymer composition to be mixed with the microorganisms is 1 mg to 100 g, preferably 10 mg to 10 g (calculated as the microorganism-produced polymer in the case of employing the polymer composition), relative to 108 cells/g of the microorganisms, regardless of whether the polymer, the polymer composition or the microorganisms are liquid or solid. The amount of the microorganism-produced polymer or microorganism-produced polymer composition to be mixed with the pollutant is not limited, but may be 1 mg to 100 g, preferably 10 mg to 10 g (calculated as the microorganism-produced polymer in the case of employing the polymer composition), relative to 1 pg of the pollutant, regardless of whether the polymer, the polymer composition or the pollutant is liquid or solid.

The moisture in the pollutant and microorganisms which coexist as incorporated in the microorganism-produced polymer, is adjusted to pH 5 to 10, preferably pH 6 to 8. The pollutant and microorganisms were then allowed to stand at 15 to 50° C., preferably 30 to 40° C., to undergo assimilation or degradation (biodegradation) of the pollutant. For the assimilation or degradation, the pollutant and microorganisms may be allowed to stand with or without agitation or shaking, under aerobic or anaerobic conditions depending on the species of the microorganisms used. Under such conditions, the pollutant biodegrades usually in 2 to 40 days, although this period is not limitative.

The present invention further provides a microbial treatment agent useful for the purification (assimilation or degradation) treatment of a pollutant.

The microbial treatment agent comprises microorganisms incorporated in the microorganism-produced polymer mentioned above. The microorganisms for use in the agent may be any of those listed above, and preferably those of the genera Pseudomonas, Rhodococcus, Aeromonas, Rhizobium, Sphingomonas, Arthrobacter, Frateuria, Flavobacterium or Bacillus. The microorganisms for use in the agent of the invention may be a single genus selected from the above genera, but it is preferable to use any two or more genera in a symbiotic state. When using two or more genera, the combination is not limited, and may be, for example, the genera Bacillus and Flavobacterium; the genera Rhodococcus and Aeromonas; the genera Pseudomonas and Rhizobium; the genera Sphingomonas and Bacillus; or the genera Flavobacterium and Arthrobacter.

The microbial treatment agent of the invention may comprise, in place of the microorganism-produced polymer, a microorganism-produced polymer composition containing the above mentioned cationic inorganic salts, galactomannans, starch, carboxymethyl celluloses, alginates (such as sodium alginate and potassium alginate), xanthan gum, pullulan or like thickening polysaccharides, chitin, chitosan or the like, in addition to the microorganism-produced polymer. Further, the microbial treatment agent may optionally contain nutrients useful for growth of the microorganisms (for example, glycerol, riboflavin, casein, polypeptone, meat extract, soybean cake, yeast extract, cellulose, glucose, corn extract, whey powder, CSL, starch or vitamins (such as thiamine, biotin, nicotinic acid amide or calcium panthotenate)); or enzymes such as amylase, protease or lipase.

The microbial treatment agent of the invention is prepared preferably by the process comprising the steps of mixing the microorganisms, microorganism-produced polymer (or the microorganism-produced polymer composition) and optional components, allowing the polymer (or the polymer composition) to incorporate the microorganisms in the presence of water, and where necessary, performing kneading, pelletization, drying and other steps, to thereby obtain a semi-dry or dry agent. The microbial treatment agent is not limited in form, and may be, for example, granules, a powder, tablets, pills, a slurry or flakes, or may be immobilized on an insoluble support.

When the method of the invention is employed for biological purification in which an environmental pollutant is assimilated or degraded by microorganisms, the inhibitory action of the pollutant on the microorganisms is suppressed because the microorganisms and pollutant are incorporated in a microorganism-produced polymer to protect the microorganisms by the surrounding polymer. Further, the microorganism-produced polymer surrounding the pollutant causes the pollutant to cohere and become concentrated, so that a high concentration of the pollutant coexists with the microorganisms and is efficiently assimilated or degraded in the microorganism-produced polymer. Preferably, the agent contains microorganisms of at least one genus, preferably at least two genera, selected from the genera Pseudomonas, Rhodococcus, Aeromonas, Rhizobium, Sphingomonas, Arthrobacter, Frateuria, Flavobacterium and Bacillus, to perform the assimilation or degradation of the pollutant more effectively. Moreover, when the microorganism-produced polymer is a polymer containing a sugar component in which fructofuranosyl group(s) is/are bonded to a fructosyl group at the β-2,6 position, or a polyamino acid containing glutamic acid, leucine, alanine or phenylalanine, the inhibitory action of the pollutant on the microorganisms is further reduced, leading to efficient proliferation of the microorganisms and effective biological purification of the pollutant.

EXAMPLES

The following examples are provided to illustrate the present invention in detail. These examples are merely embodiments of the present invention, and in no way limitative of the scope of the invention.

Example 1

A *Bacillus natto* strain isolated from commercially available *natto* (fermented soybeans) was inoculated on a culture medium containing 10 g/L of peptone (a product of Daigo Nutritive Chemicals, Ltd.), 10 g/L of meat extract (a product of Daigo Nutritive Chemicals, Ltd.) and 10 g/L of dextrin (Daigo Nutritive Chemicals, Ltd.) The strain was cultivated for 48 hours at 30° C. under aerobic conditions. The resultant culture was centrifuged for solid-liquid separation. 90% ethanol was added to the separated liquid to give precipitates. The precipitates were washed with water, and further washed with an ethanol and water repeatedly, giving polyglutamic acid. To the polyglutamic acid was added calcium chloride in an amount of 5 wt. %, to thereby obtain a microorganism-produced polymer composition.

Example 2

The microorganism-produced polymer composition prepared in Example 1 was added in an amount of 1 wt. % to a commercially available microorganism preparation (Biomu C-100 (a mixture of *Bacillus subtilis* and *Bacillus licheniformis*); a product of C•P•R CO.,LTD.), followed by mixing. Then, 50 wt. % of water and 5 wt. % of dextrin were added, and the resulting mixture was thoroughly stirred to incorporate the microorganisms into polyglutamic acid, thereby giving the microbial treatment agent according to the present invention.

Example 3

Dioxins contained in incinerated ash were utilized as environmental pollutants. Stated specifically, 1 kg of incinerated ash obtained from a local government was dispersed in 20 L of water, solids were filtered off through filter paper, and the filtrate was concentrated to obtain 2 L of waste liquid containing dioxins. The liquid was divided into two portions. 10 g of the microbial treatment agent prepared in Example 2 was added to each of the divided portions. To one of the portions was further added 50 g of the microorganism-produced polymer composition (polyglutamic acid+calcium chloride) prepared in Example 1. The two portions of liquid were incubated with shaking at 30° C. for 20 days to test the degrading action on the dioxins. The amounts of dioxins were measured according to "Provisional Manual on Soil Investigation Concerning Dioxins" published by the Environment Agency of Japan, Water Quality Preservation Bureau, Soil and Agricultural Chemical Division, on January, 1998. Table 1 shows the results. In the table, $T_4CDDs$ indicates 2,3,7,8-tetrachlorodibenzoparadioxins (2,3,7,8-$T_4CDDs$); $P_5CDDs$, 1,2,3,7,8-pentachlorodibenzoparadioxins (1,2,3,7,8-$P_5CDDs$); $H_6CDDs$, 1,2,3,7,8,9-hexachlorodibenzoparadioxins (1,2,3,7,8,9-$H_6CDDs$); $H_7CDDs$, 1,2,3,4,6,8,9-heptachlorodibenzoparadioxins (1,2,3,4,6,8,9-$H_7CDDs$); $H_8CDDs$, octachlorodibenzoparadioxins; and "Total PCDDs", all the polychlorinated dibenzoparadioxins.

TABLE 1

| Dioxins | Before incorporation of dioxins (ng/g) | After incorporation of dioxins (ng/g) | |
|---|---|---|---|
| | | Microorganisms incorporated | Microorganisms not incorporated |
| $T_4CDDs$ | 1.7 | 1.3 | 1.6 |
| $P_5CDDs$ | 2.9 | 1.4 | 2.1 |
| $H_6CDDs$ | 2.3 | 1.9 | 2.1 |
| $H_7CDDs$ | 2.2 | 0.9 | 1.5 |
| $H_8CDDs$ | 1.9 | 0.5 | 1.1 |
| Total PCDDs | 11.0 | 6.0 | 8.4 |

The above results demonstrate that microbial degradation of the pollutants (dioxins) was promoted by incorporating the pollutants in the microorganism-produced polymer composition of the present invention.

Example 4

A levan obtained from white water produced in the paper manufacturing process was used as a microorganism-produced polymer. Stated specifically, 0.5 g of egg white lysozyme (Nagase Biochemicals, Ltd.) was added to 10 kg of white water, and the enzyme reaction was carried out at 30° C. for 24 hours to degrade unnecessary bacteria present in the white water. Then, solids were removed through a 50-mesh sieve, and the resulting suspension was adjusted to a neutral pH. To the suspension was added 20 wt. % of 90% ethanol for deproteinization. The precipitated protein was filtered off. Further, 90% ethanol was added to the resulting filtrate to a final concentration of 50 wt. %. The precipitates formed were dried and used as a levan in the following experiment:

A bacterium of the genus Flavobacterium (FERM P-17663) was inoculated on a medium (polypeptone 8 g/L, meat extract 8 g/L, yeast extract 0.01 g/L, starch 10 g/L and NaCl 0.1 g/L), incubated at pH 7 and 30° C. for 48 hours. Thereafter, the culture was centrifuged to collect a pellet fraction (containing bacterial cells). The above levan, in the same amount as of the pellet fraction, was added to the pellet fraction, and the mixture was kneaded in the presence of water so as to incorporate the bacterial cells in levan.

As an environmental pollutant, selenium released from a selenium discharge tube manufacturing plant was used. Specifically, 1 $m^3$ of waste liquid containing 100 μg/L of selenium was concentrated to a selenium concentration of 100 mg/L, and the microorganism-produced polymer (levan) prepared above was added in an amount of 100 mg/L, to incorporate selenium. The Flavobacterium cells as incorporated in levan was added in an amount of 200 mg/L, to the waste water in which selenium was incorporated in levan. The mixture was cultivated with shaking for 20 days at 30° C. and pH 7. The culture was then centrifuged to measure the selenium concentration of the supernatant. Further, β-glucanase was allowed to act on the pellets to decompose and elute levan from the pellets. The eluate was then filtered to obtain Flavobacterium cells as insolubles. The bacterial cells were washed thoroughly to remove selenium from the cell surfaces, and hydrolyzed with $Na_2CO_3$ to eluate the cell components. Subsequently, the selenium concentration of the mixture of the levan decomposed liquid and the bacterial cell eluate, and the selenium concentration in the bacterial cells were measured. Table 2 presents each fraction's selenium concentration measurements obtained with and without the process for incorporation into the microorganism-produced polymer.

TABLE 2

| | Selenium concentration (mg) | | | |
|---|---|---|---|---|
| | | After purification treatment | | |
| | Before treatment | Supernatant | Levan decomposed liquid + bacterial cell eluate | Bacterial cells |
| With incorporation process | 200 | 0 | 0 | 140 |
| Without incorporation process | 200 | 198 | 2 | 0 |

The above results demonstrate that, when the microorganisms and the environmental pollutant (selenium), as incorporated in the microorganism-produced polymer, coexist with each other, most of selenium is taken up by the bacterial cells for assimilation or degradation, so that the inorganic selenium is converted into non-toxic organic selenium. The effect was remarkably high as compared with the effect of the treatment in which the microorganisms and the environmental pollutant (selenium) were not incorporated in the polymer.

What is claimed is:

1. A method for purification treatment of an environmental pollutant, comprising the step of incorporating the environmental pollutant and microorganisms in a cohesive or adhesive polysaccharide produced from bacteria of the genus Zoogloea; a levan produced from bacteria of the genus Bacillus, Acetobacter, or Pseudomonas; or a polymer containing a sugar component in which fructofuranosyl group(s) is/are bonded to a fructosyl group at the β-2,6 position.

2. The method according to claim 1, wherein the step of incorporating the environmental pollutant and microorganisms is done in the presence of a cationic inorganic salt.

3. The method according claim 2, wherein the cationic inorganic salt is at least one member selected from the group consisting of aluminum chloride, aluminum sulfate, sodium aluminate, calcium chloride, ferrous sulfate, ferric chloride, iron (III) sulfate and copper chloride.

4. The method according to claim 1, wherein the microorganisms are at least one member selected from the group consisting of the genera Pseudomonas, Rhodococcus, Aeromonas, Rhizobium, Sphingomonas, Arthrobacter, Frateuria, Flavobacterium and Bacillus.

5. The method according to claim 1, wherein the environmental pollutant is at least one member selected from the group consisting of polychlorinated biphenyls, dioxins, dichloroethylenes, dichloroethanes, trichloroethylenes, trichloroethanes, mercury and its compound, and selenium and its compounds.

6. A method for purification treatment of an environmental pollutant, comprising the step of incorporating the environmental pollutant and microorganisms in a polyamino acid.

7. The method according to claim 6, wherein the polyamino acid contains at least one amino acid selected from the group consisting of glutamic acid, leucine, alanine and phenylalanine.

8. The method according to claim 6, wherein the polyamino acid substantially consist of glutamic acid, leucine or alanine.

9. The method according to claim 6, wherein the polyamino acid contains at least 65% of one amino acid selected from the group consisting of glutamic acid, leucine and alanine.

10. The method according to claim 6, wherein the step of incorporating the environmental pollutant and microorganisms is done in the presence of a cationic inorganic salt.

11. The method according claim 10, wherein the cationic inorganic salt is at least one member selected from the group consisting of aluminum chloride, aluminum sulfate, sodium aluminate, calcium chloride, ferrous sulfate, ferric chloride, iron (III) sulfate and copper chloride.

12. The method according to claim 6, wherein the microorganisms are at least one member selected from the group consisting of the genera Pseudomonas, Rhodococcus, Aeromonas, Rhizobium, Sphingomonas, Arthrobacter, Frateuria, Flavobacterium and Bacillus.

13. The method according to claim 6, wherein the environmental pollutant is at least one member selected from the group consisting of polychlorinated biphenyls, dioxins, dichloroethylenes, dichloroethanes, trichloroethylenes, trichloroethanes, mercury and its compound, and selenium and its compounds.

14. A microbial treatment agent for purifying an environmental pollutant comprising microorganisms incorporated in a cohesive or adhesive polysaccharide produced from bacteria of the genus Zoogloea; a levan produced from bacteria of the genus Bacillus, Acetobacter, or Pseudomonas; or a polymer containing a sugar component in which fructofuranosyl group(s) is/are bonded to a fructosyl group at the β-2,6 position.

15. The microbial treatment agent according to claim 14, wherein the microorganisms are at least one member selected from the group consisting of the genera Pseudomonas, Rhodococcus, Aeromonas, Rhizobium, Sphingomonas, Arthrobacter, Frateuria, Flavobacterium and Bacillus.

16. The microbial treatment agent according to claim 14, wherein the microorganisms are a mixture of at least two members selected from the group consisting of the genera Pseudomonas, Rhodococcus, Aeromonas, Rhizobium, Sphingomonas, Arthrobacter, Frateuria, Flavobacterium and Bacillus.

17. The microbial treatment agent according to claim 14, further comprising a cationic inorganic salt.

18. The microbial treatment agent according to the claim 17, wherein the cationic inorganic salt is at least one member selected from the group consisting of aluminum chloride, aluminum sulfate, sodium aluminate, calcium chloride, ferrous sulfate, ferric chloride, iron (III) sulfate and copper chloride.

19. The microbial treatment agent according to claim 14, wherein the microorganism is capable of assimilation or degradation of the environmental pollutant.

20. The microbial treatment agent according to claim 19, wherein the environmental pollutant is at least one member selected from the group consisting of polychlorinated biphenyls, dioxins, dichloroethylenes, dichloroethanes, trichloroethylenes, trichloroethanes, ethylenes, mercury and its compounds, and selenium and its compounds.

21. A microbial treatment agent for purifying an environmental pollutant comprising microorganisms incorporated in a polyamino acid.

22. The microbial treatment agent according to claim 21, wherein the polyamino acid substantially consists of glutamic acid, leucine or alanine.

23. The microbial treatment agent according to claim 21, wherein the polyamino acid contains at least 65% of one amino acid selected from the group consisting of glutamic acid, leucine and alanine.

24. The microbial treatment agent according to claim 21, wherein the microorganisms are at least one member selected from the group consisting of the genera Pseudomonas, Rhodococcus, Aeromonas, Rhizobium, Sphingomonas, Arthrobacter, Frateuria, Flavobacterium and Bacillus.

25. The microbial treatment agent according to claim 21, wherein the microorganisms are a mixture of at least two members selected from the group consisting of the genera Pseudomonas, Rhodococcus, Aeromonas, Rhizobium, Sphingomonas, Arthrobacter, Frateuria, Flavobacterium and Bacillus.

26. The microbial treatment agent according to claim 21, further comprising a cationic inorganic salt.

27. The microbial treatment agent according to the claim 26, wherein the cationic inorganic salt is at least one member selected from the group consisting of aluminum chloride, aluminum sulfate, sodium aluminate, calcium chloride, ferrous sulfate, ferric chloride, iron (III) sulfate and copper chloride.

28. The microbial treatment agent according to claim 21, wherein the microorganism is capable of assimilation or degradation of the environmental pollutant.

29. The microbial treatment agent according to claim 28, wherein the environmental pollutant is at least one member selected from the group consisting of polychlorinated biphenyls, dioxins, dichloroethylenes, dichloroethanes, trichloroethylenes, trichloroethanes, ethylenes, mercury and its compounds, and selenium and its compounds.

* * * * *